(12) United States Patent
Daul et al.

(10) Patent No.: US 11,872,632 B1
(45) Date of Patent: Jan. 16, 2024

(54) SYSTEMS AND METHODS FOR PRODUCING POWDERS FROM TWO OR MORE MATERIALS

(71) Applicant: GM GLOBAL TECHNOLOGY OPERATIONS LLC, Detroit, MI (US)

(72) Inventors: Ronald C Daul, Northville, MI (US); Qigui Wang, Rochester Hills, MI (US); Ali Shabbir, Sterling Heights, MI (US); Yucong Wang, West Bloomfield, MI (US); Andrew J Buckland, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/146,645

(22) Filed: Dec. 27, 2022

(51) Int. Cl.
| | |
|---|---|
| *B22F 9/06* | (2006.01) |
| *B01J 8/00* | (2006.01) |
| *B33Y 70/00* | (2020.01) |
| *B22F 1/17* | (2022.01) |
| *B22F 9/08* | (2006.01) |

(52) U.S. Cl.
CPC ............. *B22F 9/06* (2013.01); *B01J 8/0075* (2013.01); *B22F 1/17* (2022.01); *B33Y 70/00* (2014.12); *B22F 2009/0836* (2013.01); *B22F 2202/06* (2013.01); *B22F 2999/00* (2013.01)

(58) Field of Classification Search
None
See application file for complete search history.

(56) References Cited

U.S. PATENT DOCUMENTS

2020/0198005 A1\* 6/2020 Li ............................. B22F 5/02

\* cited by examiner

*Primary Examiner* — Scott R Kastler
(74) *Attorney, Agent, or Firm* — Lorenz & Kopf LLP

(57) ABSTRACT

Systems and methods are provided for producing powders. The system includes a housing having an enclosure, a crucible configured to produce a melt of a first material, a droplet device configured to receive the melt of the first material from the crucible and produce a flow of droplets of the melt of the first material within the enclosure of the housing, wherein the droplets solidify within the enclosure, and a distribution device configured to propel a second material into the flow of droplets of the first material within the enclosure such that the second material is mixed with the droplets of the first material to produce the powder that includes the first material, the second material, and/or a reaction product thereof.

18 Claims, 3 Drawing Sheets

SYSTEMS AND METHODS FOR PRODUCING POWDERS FROM TWO OR MORE MATERIALS

INTRODUCTION

The technical field generally relates to powder production, and more particularly relates to systems and method for producing a highly uniform powder formed of or including two or more materials.

Additive manufacturing (AM) processes, such as laser powder bed fusion (LPBF), have recently come to prominence as a cost-effective alternative to traditional manufacturing techniques. Additive manufacturing is defined by the American Society for Testing and Materials (ASTM) as the "process of joining materials to make objects from 3D model data, usually layer upon layer, as opposed to subtractive manufacturing methodologies, such as traditional machining and casting." Additive manufacturing produces sequential layers from a build material, typically a powder or wire feedstock. Due in part to the growing prevalence of additive manufacturing, powders having highly uniform compositions and/or mixtures are becoming increasingly desirable.

Accordingly, it is desirable to provide systems and methods capable of producing highly uniform powders for applications such as additive manufacturing. Furthermore, other desirable features and characteristics of the present invention will become apparent from the subsequent detailed description and the appended claims, taken in conjunction with the accompanying drawings and the foregoing technical field and background.

SUMMARY

A system is provided for producing a powder. In one embodiment, the system includes a housing having an enclosure, a crucible configured to produce a melt of a first material, a droplet device configured to receive the melt of the first material from the crucible and produce a flow of droplets of the melt of the first material within the enclosure of the housing, wherein the droplets solidify within the enclosure, and a distribution device configured to propel a second material into the flow of droplets of the first material within the enclosure such that the second material is mixed with the droplets of the first material to produce the powder that includes the first material, the second material, and/or a reaction product thereof.

In various embodiments, particles of the powder may include an alloy of the first material and the second material.

In various embodiments, particles of the powder may include a core formed of the first material and a coating of the second material thereon.

In various embodiments, the powder may include a mixture of particles of the first material and the second material.

In various embodiments, the droplet device may be configured to apply an electrostatic charge to the first material and/or the distribution device is configured to apply an electrostatic charge to the second material.

In various embodiments, the system may include three or more surfaces in fixed positions within the enclosure configured to contact the stream of the first material and the second material such that a stream of the first material and the second material sequentially slide along the three or more surfaces, pass through passages therebetween, and are directed in a serpentine path of travel. The system may include an inlet configured to direct a flow of gas into the enclosure and an outlet configured to direct the flow of gas out of the enclosure, wherein the flow of gas within the enclosure contacts the stream of the first material and the second material and produces a fluidized bed thereof. The system may include a plurality of holes in the three or more surfaces configured to facilitate formation of the fluidized bed.

In various embodiments, the system may include an inlet configured to direct a flow of gas into the enclosure and an outlet configured to direct the flow of gas out of the enclosure, wherein the flow of gas within the enclosure contacts a stream of the first material and the second material and produces a fluidized bed thereof.

In various embodiments, the system may include a second distribution device configured to propel a third material into the flow of droplets of the first material within the enclosure such that the third material is mixed with the droplets of the first material.

A method is provided for producing powder. In one embodiment, the method includes increasing a temperature of a first material sufficient to produce a melt thereof, producing a flow of droplets of the melt of the first material within an enclosure of a housing, wherein the droplets solidify within the enclosure, propelling a second material into the flow of droplets of the first material within the enclosure such that the second material is mixed with the droplets of the first material to produce the powder that includes the first material, the second material, and/or a reaction product thereof.

In various embodiments, the powder may include an alloy of the first material and the second material.

In various embodiments, the particles of the powder may include a core formed of the first material and a coating of the second material thereon.

In various embodiments, the powder may include a mixture of particles of the first material and the second material.

In various embodiments, the method may include applying an electrostatic charge to the first material and/or the second material prior to contact therebetween.

In various embodiments, the method may include contacting the stream of the first material and the second material on three or more surfaces within the enclosure such that the stream of the first material and the second material sequentially slide along the three or more surfaces, pass through passages therebetween, and are thereby directed in a serpentine path of travel. The method may include directing a flow of gas into the enclosure through an inlet thereof and directing the flow of gas out of the enclosure through an outlet thereof, wherein the flow of gas within the enclosure contacts the stream of the first material and the second material and produces a fluidized bed thereof. The method may include directing the gas through a plurality of holes in the three or more surfaces to facilitate formation of the fluidized bed.

In various embodiments, the method may include directing a flow of gas into the enclosure through an inlet thereof and directing the flow of gas out of the enclosure through an outlet thereof, wherein the flow of gas within the enclosure contacts the stream of the first material and the second material and produces a fluidized bed thereof.

In various embodiments, the method may include propelling a third material into the flow of droplets of the first material within the enclosure such that the third material is mixed with the droplets of the first material, wherein the stream includes the first material, the second material, and the third material.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

Figure 1:
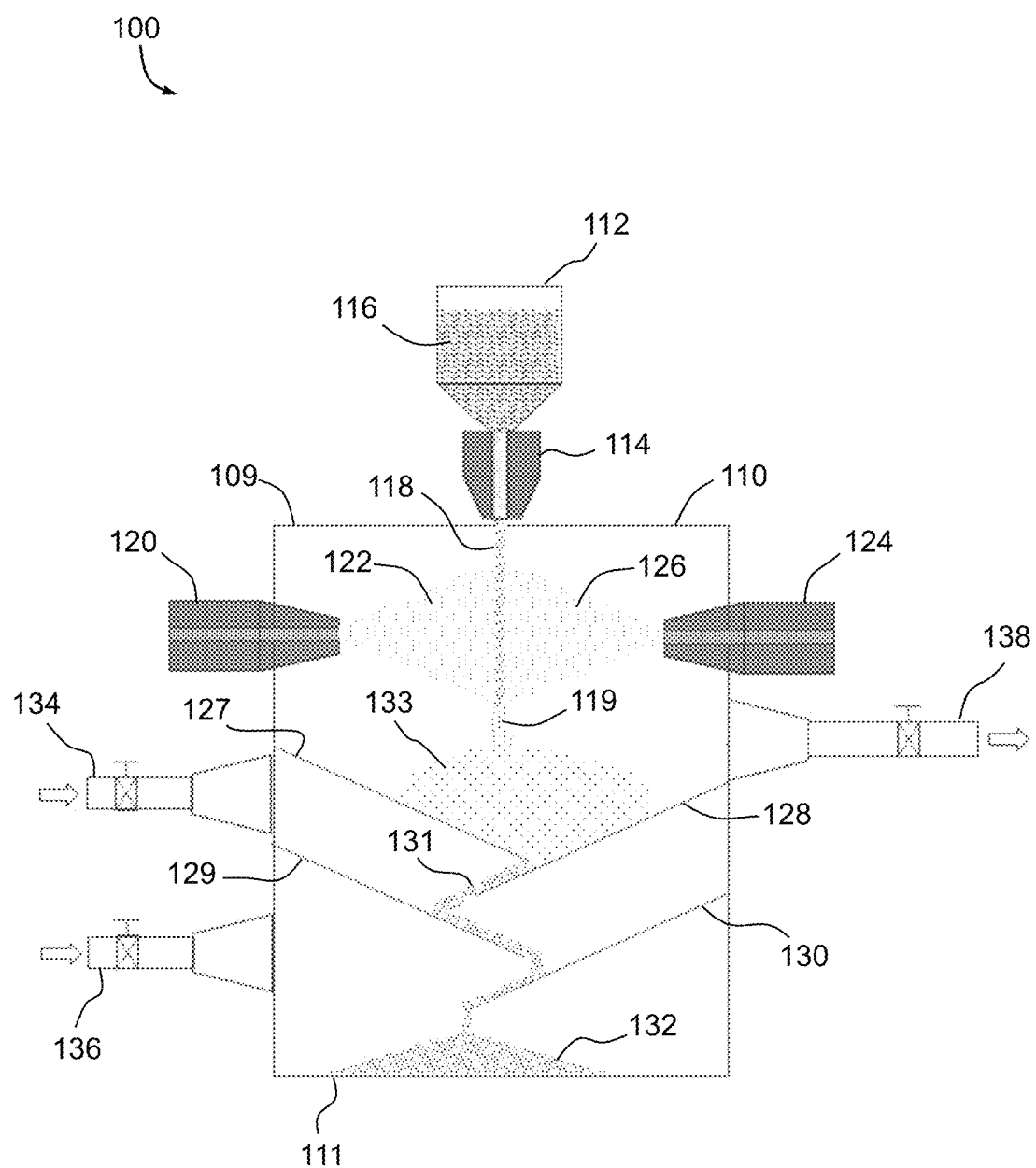
FIG. 1 is diagram of a first system for producing powder in accordance with an embodiment.

FIG. 1 presents an exemplary system 100 for producing various types of powders that include two or more materials having different compositions. The system 100 includes a housing 110 having walls that in combination define an enclosure therebetween. The housing 110 is not limited to any particular shape. In some embodiments, the housing 110 may be rectangular or cylindrical.

A crucible 112 is provided that is configured to receive a first material 116 from a source thereof and increase the temperature of the first material 116 sufficient to produce a melt of the first material 116. The crucible 112 may be any type of crucible using any type of heating element (e.g., electric resistance) configured to increase the temperature of the first material 116 sufficient to form the melt. In the embodiment of FIG. 1, the crucible 112 includes a funnel configured to direct the melt by gravity to an outlet of the crucible 112.

The melt may be directed from the crucible 112 to a droplet device 114. The droplet device 114 may be any type of device configured to receive the melt from the crucible 112, produce therefrom a flow of droplets 118 of the melt, and expel the droplets 118 into the enclosure of the housing 110. Nonlimiting examples of droplet devices 114 may include, but are not limited to, various atomizer devices, electromagnetic devices, etc. In the embodiment of FIG. 1, the droplets 118 freefall through the enclosure from an outlet of the droplet device 114. Alternatively, the droplets 118 may be sprayed or otherwise propelled into the enclosure by the droplet device 114.

One or more distribution devices may be provided to propel additional materials into the enclosure to contact, react with, and/or mix with the droplets 118 of the first material 116 therein. In the embodiment of FIG. 1, the system 100 includes a first distribution device 120 configured to propel (e.g., spray) a second material 122 and a second distribution device 124 configured to propel a third material 126. Nonlimiting examples of distribution devices 120 and 124 may include, but are not limited to, various pressurized spray nozzles, mechanical throwing devices (e.g., spinning wheel), etc. Although the first distribution device 120 and the second distribution device 124 are represented as propelling the second material 122 and the third material 126, respectively, in directions perpendicular to the flow of droplets 118 and opposite each other, other arrangements may be provided. For example, the additional materials may be propelled at different angles relative to the travel path of the droplets 118 (e.g., 1 to 89 degrees), at different angles relative to each other, and/or to contact the droplets 118 at different positions (relative to a distance traveled by the droplets 118 and/or relative to each other). The propelled second material 122 and third material 126 mix with the droplets 118 to produce a stream 119 of the first material 116, the second material 122, and the third material 126 which continues to travel toward the lower end 111 of the housing 110.

The droplets 118 cool and solidify within the enclosure to form particles. Preferably, the droplets 118 solidify during flight thereof prior to contacting surfaces of the housing 110. The system 100 may be configured such that the droplets 118 solidify prior to contacting, reacting, and/or mixing with the second material 122 and the third material 126, subsequent to contacting, reacting, and/or mixing with the second material 122 and the third material 126, or prior to contacting, reacting, and/or mixing with either of the second material 122 and the third material 126 and subsequent to contacting, reacting, and/or mixing with the other of the second material 122 and the third material 126. The second material 122 and the third material 126 may include solid particles, liquid droplets, or a combination thereof.

In various embodiments, the droplet device 114, the first distribution device 120, and/or the second distribution device 124 may be configured to apply an electrostatic charge to the first material 116, the second material 122, and/or the third material 126, respectively. In such embodiments, the electrostatic charge may be configured to produce or intensify attractions between the first material 116, the second material 122, and/or the third material 126. Various devices and methods known in the art may be used to apply the electrostatic charge(s).

The housing 110 may include one or more surfaces located within the path of the stream 119 of the first material 116, the second material 122, and the third material 126. The surface(s) may be defined by fixed structure(s) within the enclosure that are configured to contact the stream 119 such that the stream 119 slides along the surface(s). In the embodiment of FIG. 1, the housing 110 includes first, second, third, and fourth contact structures 127, 128, 129, and 130 within the enclosure. The contact structures 127, 128, 129, and 130 are arranged in an interdigitated manner relative to each other such that ends thereof overlap each other along a direction aligned with the path of travel of the stream 119. The contact structures 127, 128, 129, and 130 are spaced apart between the upper end 109 and the lower end 111 of the housing 110 to provide passages between each of the adjacent contact structures 127, 128, 129, and 130. The contact structures 127, 128, 129, and 130 are each angled or sloped relative to the path of travel of the stream 119 toward the lower end 111 of the housing 110.

With this arrangement, the stream 119 may sequentially contact each of the contact structures 127, 128, 129, and 130, slide along surfaces thereof to the end thereof, and then fall and contact the next of the contact structures 127, 128, 129, and 130. Specifically, the stream 119 may contact the first contact structure 127, slide thereon and fall to the second contact structure 128, slide thereon and fall to the third contact structure 129, slide thereon and fall to the fourth contact structure 130. As such, the stream 119 is directed by the contact structures 127, 128, 129, and 130 along a serpentine path of travel to define a serpentine stream 131. Upon passing the end of the fourth contact structure 130, the serpentine stream 131 may fall toward the lower end 111 of the housing 110 for collection. In some embodiments, a powder 132 at the lower end 111 of the housing 110 may be directed to a storage or packaging system (not shown). The surfaces of the contact structures 127, 128, 129, and 130 may be planar, curved, or any other shape.

One or more inlets are provided that are configured to direct a flow of an inert gas into the enclosure and one or more outlets are provided that are configured to direct the flow of the gas out of the enclosure. In the embodiment of FIG. 1, the system 100 includes a first inlet 134 located between the first contact structure 127 and the third contact structure 129, and a second inlet 136 located between the third contact structure 129 and the lower end 111 of the housing 110. The system 100 further includes an outlet 138 located between the second contact structure 128 and the upper end 109 of the housing 110. With this arrangement, the gas may flow through the passages between each of the contact structure 127, 128, 129, and 130 in a direction generally toward the upper end 109 of the housing 110. The gas may be any inert gas such as but not limited to helium, neon, argon, krypton, xenon, and radon. In various embodiments, the gas may be used to reduce the temperature of the droplets 118 within the enclosure. For example, the gas may have a temperature below a solidification temperature of the first material 116 upon exiting the first and second inlets 134 and 136. In some embodiments, the gas may have a temperature sufficiently low to ensure that the droplets 118 solidify prior to contacting the second material 122 and/or the third material 126, subsequent to contacting the second material 122 and/or the third material 126 but prior to contacting a surface of the housing 110, or subsequent to contacting a surface of the housing 110.

In various embodiments, the flow rate and direction of the gas may contact the stream 119 and result the formation of a fluidized bed 133 comprising the first material 116, the second material 122, the third material 126, and/or reaction products thereof. The properties of the fluidized bed 133 may be modified by altering the angle, size, and/or the spacing (e.g., size of the passages) between the contact structures 127, 128, 129, and 130. In various embodiments, additional features may be included to adjust the properties of the fluidized bed 133. For example, an array of holes may be provided through one or more of the contact structures 127, 128, 129, and 130 that are sufficiently large to allow the gas to pass through but sufficiently small such that particles of the stream 119, the fluidized bed 133, and/or the serpentine stream 131 cannot pass through the holes.

In various embodiments, the fluidized bed 133 is configured to delay the fall of the particles therein while simultaneously increasing contact between and/or mixing of the particles. In various embodiments, the fluidized bed 133 is configured to fluidize powders with particle sizes ranging from a few micrometers to at least 100 micrometers in diameter. Although the embodiment represented in FIG. 1 includes only one fluidized bed 133 and a single passage for the particles exiting the fluidized bed 133, in various embodiments the system 100 may include more than one fluidized bed 133 and/or more than one passage therefrom. With such arrangements, the system 100 may be configured to produce more than one separate powder 132 each having different particle size ranges and/or sphericity ranges. In various embodiments, the fluidized bed 133 is configured to control particle sizes of the powder to a range typical to additively manufacturing (AM) processes such as, for example, about 10 to 50 µm.

Figure 2:
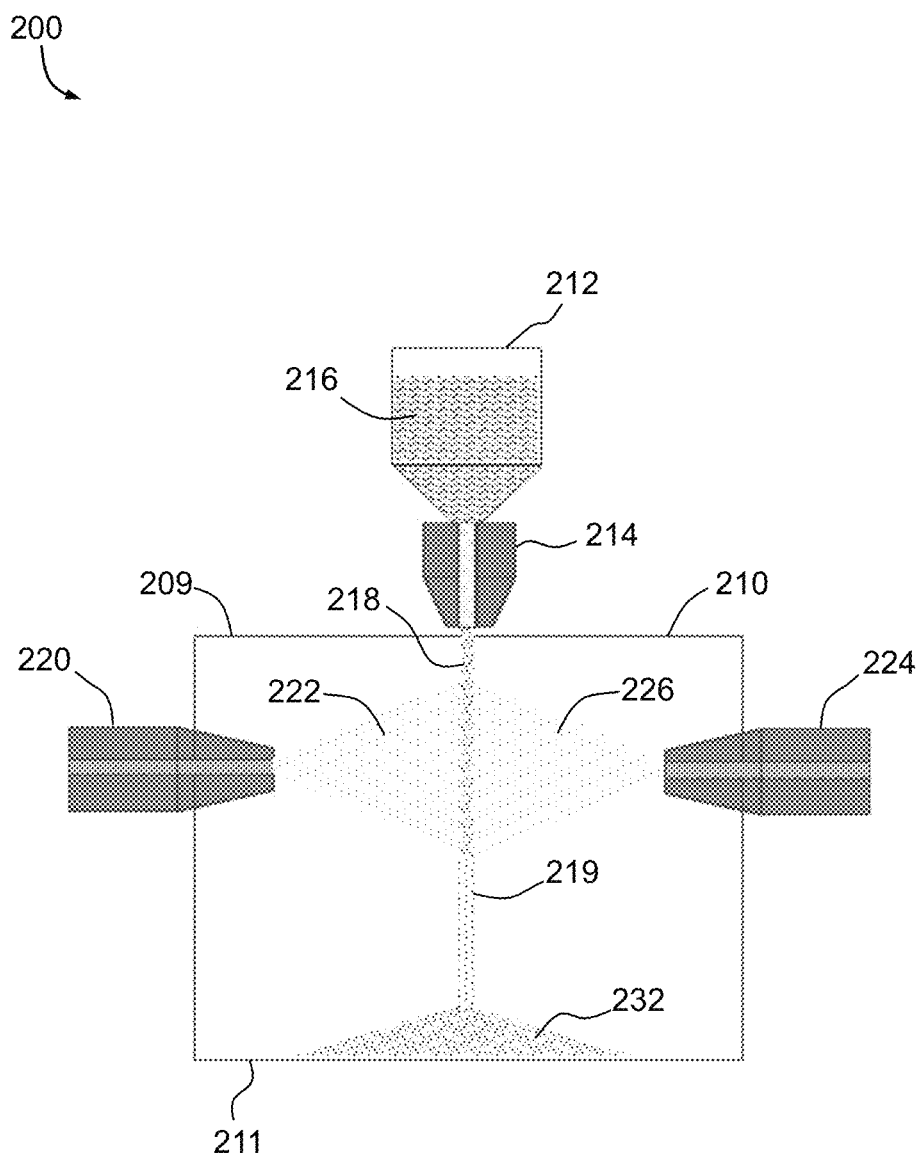
FIG. 2 is a diagram of a second system for producing powder in accordance with an embodiment.

FIG. 2 represents a second exemplary system 200 for producing various types of powders that include two or more materials. For convenience, consistent reference numbers are used in FIG. 2 to identify the same or functionally related/equivalent elements as those of FIG. 1, but with a numerical prefix (i.e., 2) added to distinguish the particular embodiment from other embodiments of the of the figures. In view of similarities between the embodiments, the following discussion of FIG. 2 may focus primarily on aspects of the embodiment that differ from the other embodiments in some notable or significant manner. Other aspects of the embodiment not discussed in any detail can be, in terms of structure, function, materials, etc., essentially as was described for the embodiment of FIG. 1.

The system 200 includes a housing 210 having an enclosure, a crucible 212, a droplet device 214, distribution devices 220 and 224 which all operation in a substantially similar manner to the corresponding component of the system 100. In this embodiment, the contact structures 127, 128, 129, and 130 are omitted. As such, the stream 219 of the first material 216, the second material 222, and the third material 226 travels directly to the lower end 211 of the housing 210 and a fluidized bed is not formed. The enclosure may include an environment that includes an inert gas at a temperature below the solidification temperature of the first material 216, preferably sufficiently low such that the first material 216 solidifies in flight, that is, prior to reaching the lower end 211 of the housing 210.

It should be noted that the embodiments of FIGS. 1 and 2 are merely for illustrative purposes and the systems 100 and 200 may have other configurations, including various combinations of the components represented in FIGS. 1 and 2.

The first material 116/216, the second material 122/222, and the third material 126/226, and the powder 132/232 formed therefrom may include various materials including certain polymeric, metallic, ceramic, and composite materials. In various embodiments, the first material 116/216 is a metallic material, at least one of the second material 122/222 and the third material 126/226 is an alloying element, and the powder 132/232 includes an alloy of the first material 116/216 and the second material 122/222 and/or the third material 126/226. In various embodiments, the first material 116/216 is a metallic material, at least one of the second material 122/222 and the third material 126/226 is a melt treatment agent (e.g., grain refiners), and the powder 132/232 includes a combination of the first material 116/216 and the second material 122/222 and/or the third material 126/226. In various embodiments, the first material 116/216 is a polymeric or metallic material, at least one of the second material 122/222 and the third material 126/226 includes distinct particles of a polymeric, metallic, ceramic, or composite material that does not react or combine with the first material 116/216, and the powder 132/232 includes particles having a core formed of the first material 116/216 and a coating or a layer of particles of the second material 122/222 and/or the third material 126/226 thereon. In various embodiments, the first material 116/216 is a polymeric or metallic material, at least one of the second material 122/222 and the third material 126/226 includes distinct particles of a polymeric, metallic, ceramic, or composite material that do not react or combine with the first material 116/216, and the powder 132/232 includes a mixture of particles of the first material 116/216, the second material 122/222, and/or the third material 126/226. In various embodiments, the powder 132/232 includes a nickel-, iron-, cobalt-, copper-, titanium-, and/or aluminum-based alloy. In various embodiments, the powder 132/232 includes acrylonitrile butadiene styrene (ABS), polylactide (PLA), polycarbonate (PC), polyamide (nylon), an epoxy resin, a wax, and/or a photopolymer resin. In various embodiments, the first material 116/216 includes aluminum or an alloy thereof or iron or an alloy thereof, and the second and third materials 122/222 and 126/226 include grain refinement agents, eutectic modifiers, oxygen removing elements, or various composite particles.

The powder 132/232 may include particles having various particle sizes, including submicron particles sizes. In various embodiments, the particles of the powder 132/232 may have particles sizes of between about 10 to 300 µm, such as between about 10 to 100 µm, between about 10 to 50 µm, and between about 15 to 20 µm. In various embodiments, the powder 132/232 have a powder sphericity of greater than 0.7, such as about 0.75 to 0.85, such as about 0.8.

The powder 132/232 may be configured for use in various applications. In some embodiments, the powder 132/232 is configured for use as a build material in an additive manufacturing process. As used herein, the term additive manufacturing refers to any process wherein thin successive layers of material are laid down atop one another to form an article. Some examples of additive layer manufacturing processes include laser powder bed fusion, binder jetting, directed energy deposition, and electron beam powder bed fusion. Other additive manufacturing processes may also be employed.

Figure 3:
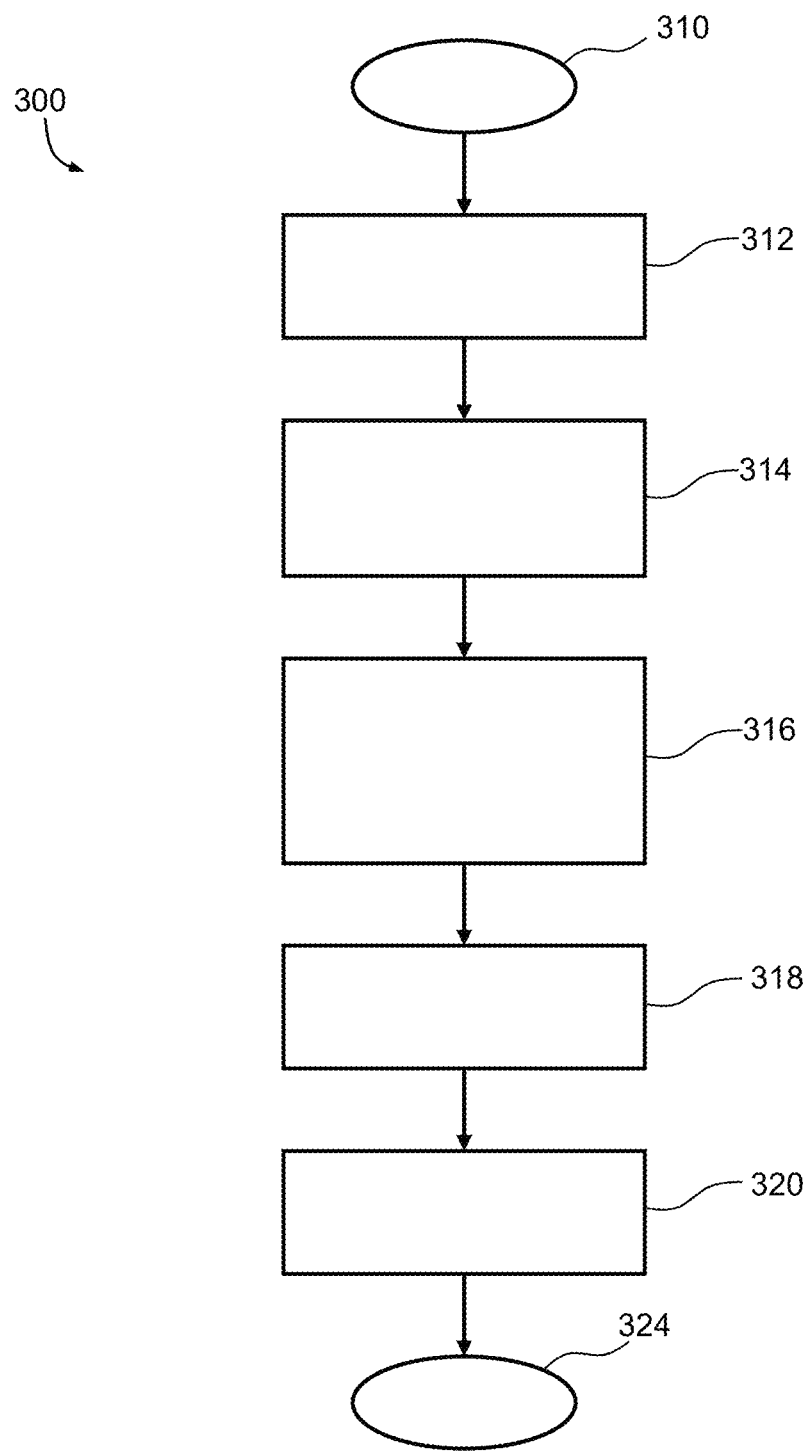
FIG. 3 is flowchart illustrating a method of producing a powder. in accordance with an embodiment.

With reference now to FIG. 3 a flowchart provides a method 300 for producing a powder as performed by the system 100 or 200, in accordance with exemplary embodiments. As can be appreciated in light of the disclosure, the order of operation within the method 300 is not limited to the sequential execution as illustrated in FIG. 3, but may be performed in one or more varying orders as applicable and in accordance with the present disclosure.

In one example, the method 300 may start at 310. The method 300 may include, at 312, increasing a temperature of a first material sufficient to produce a melt thereof. The method 300 may include, at 314, producing a flow of droplets of the melt of the first material within an enclosure of a housing. At 316, the method 300 may include propelling a second material into the flow of droplets of the first material within the enclosure such that the second material is mixed with the droplets of the first material to produce a stream of the first material and the second material. Optionally, the method 300 may include propelling one or more additional materials into the flow of droplets of the first material within the enclosure such that the additional material(s) are mixed with the droplets of the first material. At 318, the method 300 may include allowing the droplets of the melt to solidify within the enclosure to form particles. At 320, the method 300 may include collecting a powder that includes the particles. The method 300 may end at 324.

The systems 100 and 200 and the method 300 provide various benefits. Combining the various materials in the manner described herein (e.g., during free fall and/or within a fluidized bed) promotes high levels of contact and collision between gases, liquids, and solids for uniform mixing, homogenization, and potentially high-volume production. Furthermore, the systems 100 and 200 and the method 300 are capable of producing powders from two or more types of materials. This can allow for control over composition and microstructure. For example, grain refiner agents may be mixed with metallic particles to promote uniform equiaxed grain structures that, for example, do not include columnar grains, which can significantly reduce material mechanical properties (e.g., tensile and fatigue strengths).

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system for producing a powder, the system comprising:
   a housing having an enclosure;
   a crucible configured to increase a temperature of a first material and produce a melt of the first material;
   a droplet device configured to receive the melt of the first material from the crucible and produce a flow of droplets of the melt of the first material within the enclosure of the housing, wherein the droplets of the first material solidify in the enclosure;
   a first distribution device configured to propel a second material into the flow of droplets of the first material within the enclosure such that the second material is mixed with the droplets of the first material; and
   a second distribution device configured to propel a third material into the flow of droplets of the first material within the enclosure such that the third material is mixed with the droplets of the first material,
   wherein the first material, the second material, and the third material mix to produce the powder that includes the first material, the second material, the third material, and/or one or more reaction products thereof.

2. The system of claim 1, wherein the first distribution device is configured to propel an alloying element, and particles of the powder include an alloy of the first material, the second material, and/or the third material.

3. The system of claim 1, wherein the first distribution device is configured to propel distinct particles of a polymeric, metallic, or composite material, and particles of the powder include a core formed of the first material and a coating or layer of the second material and/or the third material thereon.

4. The system of claim 1, wherein the first distribution device is configured to propel distinct particles of a polymeric, metallic, or composite material, and the powder includes a mixture of particles of at least two of the first material, the second material, the third material, and/or the one or more reaction products thereof.

5. The system of claim 1, wherein the droplet device is configured to apply an electrostatic charge to the first material, the first distribution device is configured to apply an electrostatic charge to the second material, and/or the second distribution device is configured to apply an electrostatic charge to the third material.

6. A system for producing a powder, the system comprising:
   a housing having an enclosure;
   a crucible configured to increase a temperature of a first material and produce a melt of the first material;
   a droplet device configured to receive the melt of the first material from the crucible and produce a flow of droplets of the melt of the first material within the enclosure of the housing, wherein the droplets of the first material solidify in the enclosure;
   a distribution device configured to propel a second material into the flow of droplets of the first material within the enclosure such that the second material is mixed with the droplets of the first material to produce the powder that includes the first material, the second material, and/or a reaction product thereof; and three or more surfaces in fixed positions within the enclosure configured to contact a stream of the first material and the second material such that the stream of the first material and the second material sequentially slide along the three or more surfaces, pass through passages therebetween, and are directed in a serpentine path of travel.

7. The system of claim 6, further comprising an inlet configured to direct a flow of gas into the enclosure and an outlet configured to direct the flow of gas out of the enclosure, wherein the flow of gas within the enclosure contacts the stream of the first material and the second material and produces a fluidized bed thereof.

8. The system of claim 7, further comprising a plurality of holes in the three or more surfaces configured to facilitate formation of the fluidized bed.

9. The system of claim 1, further comprising an inlet configured to direct a flow of gas into the enclosure and an outlet configured to direct the flow of gas out of the enclosure, wherein the flow of gas within the enclosure contacts a stream of the first material, the second material, the third material, and/or the one or more reaction products thereof and produces a fluidized bed thereof.

10. A method for producing a powder, the method comprising:

increasing a temperature of a first material in a crucible sufficient to produce a melt thereof;

providing the melt from the crucible to a droplet device and producing a flow of droplets of the melt of the first material within an enclosure of a housing with the droplet device, wherein the droplets of the first material solidify within the enclosure;

propelling a second material into the flow of droplets of the first material within the enclosure with a first distribution device and propelling a third material into the flow of droplets of the first material within the enclosure with a second distribution device such that the second material and the third material are mixed with the droplets of the first material to produce the powder that includes the first material, the second material, the third material, and/or one or more reaction products thereof.

11. The method of claim 10, wherein particles of the powder include an alloy of the first material, the second material, and/or the third material.

12. The method of claim 10, wherein particles of the powder include a core formed of the first material and a coating or layer of the second material and/or the third material thereon.

13. The method of claim 10, wherein the powder includes a mixture of particles of at least two of the first material, the second material, the third material, and/or the one or more reaction products thereof.

14. The method of claim 10, further comprising applying an electrostatic charge to the first material, the second material, and/or the third material prior to contact therebetween.

15. The method of claim 10, further comprising contacting a stream of the first material, the second material, the third material, and/or the one or more reaction products thereof on three or more surfaces within the enclosure such that the stream sequentially slides along the three or more surfaces, passes through passages therebetween, and is thereby directed in a serpentine path of travel.

16. The method of claim 15, further comprising directing a flow of gas into the enclosure through an inlet thereof and directing the flow of gas out of the enclosure through an outlet thereof, wherein the flow of gas within the enclosure contacts the stream and produces a fluidized bed thereof.

17. The method of claim 16, further comprising directing the gas through a plurality of holes in the three or more surfaces to facilitate formation of the fluidized bed.

18. The method of claim 10, further comprising directing a flow of gas into the enclosure through an inlet thereof and directing the flow of gas out of the enclosure through an outlet thereof, wherein the flow of gas within the enclosure contacts a stream of the first material, the second material, the third material, and/or the one or more reaction products thereof and produces a fluidized bed thereof.

* * * * *